(12) United States Patent
Duller

(10) Patent No.: US 7,708,329 B2
(45) Date of Patent: May 4, 2010

(54) STOWABLE STORAGE COMPARTMENT FOR A MOTOR VEHICLE

(75) Inventor: Bernardo M. Duller, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 11/852,497

(22) Filed: Sep. 10, 2007

(65) Prior Publication Data

US 2009/0066104 A1    Mar. 12, 2009

(51) Int. Cl.
*B60R 9/02* (2006.01)
(52) U.S. Cl. .................. 296/37.5; 296/37.6; 296/37.13; 296/37.16
(58) Field of Classification Search ................ 296/37.1, 296/37.5, 37.6, 37.13, 37.8, 37.16; 224/403–405, 224/282, 497–499, 549, 563
See application file for complete search history.

(56) References Cited

U.S. PATENT DOCUMENTS

| | | | |
|---|---|---|---|
| 5,368,210 A * | 11/1994 | Wotring ...................... 224/404 |
| 5,535,931 A * | 7/1996 | Barlow et al. ............... 224/404 |
| 5,884,957 A * | 3/1999 | Shoen et al. ............... 296/37.1 |
| 6,334,562 B1 | 1/2002 | Ament et al. |
| 6,349,865 B1 | 2/2002 | Tolley et al. |
| 6,536,826 B1 * | 3/2003 | Reed .......................... 296/37.5 |
| 6,824,184 B2 | 11/2004 | Leitner et al. |
| 6,848,732 B2 * | 2/2005 | Green ...................... 296/24.33 |
| 6,942,270 B1 * | 9/2005 | Mulvihill ................. 296/37.16 |
| 7,121,601 B2 * | 10/2006 | Mulvihill et al. ......... 296/24.33 |
| 7,234,618 B2 * | 6/2007 | Warganich .................. 224/404 |
| 7,309,093 B2 * | 12/2007 | Ward .......................... 296/37.6 |
| 7,350,681 B2 * | 4/2008 | Polburn et al. .............. 224/275 |
| 2004/0050889 A1 * | 3/2004 | Shafer et al. ................ 224/403 |

\* cited by examiner

*Primary Examiner*—Glenn Dayoan
*Assistant Examiner*—Gregory Blakenship
(74) *Attorney, Agent, or Firm*—Ralph E. Smith

(57) ABSTRACT

A stowable storage compartment for a motor vehicle having a frame and a flexible container portion attached to the frame, and a lid mounted on the frame, wherein the lid includes a receptacle for holding the flexible container portion when the storage compartment is stowed.

20 Claims, 5 Drawing Sheets

STOWABLE STORAGE COMPARTMENT FOR A MOTOR VEHICLE

FIELD OF THE INVENTION

The present invention relates to a stowable storage container, i.e. compartment for holding and organizing small articles within an interior of a motor vehicle, and, more particularly, to a stowable storage compartment for holding and organizing small articles within a bed of a pick-up truck.

BACKGROUND OF THE INVENTION

A variety of storage devices have been developed to enhance the carrying capacity and organization of motor vehicle interiors. Additionally, variously configured storage containers have been developed specifically to enhance the organization of pick-up truck beds with the focus on carrying smaller items in an organized manner.

Generally these types of containers have taken the form of somewhat rigid compartments designed to be permanently installed inside the pick-up truck bed. As such, rigid containers take up valuable space even when not in use, and are thus likely to hinder storage and transport of bulkier cargo. Furthermore, such containers' permanent nature, e.g. anchored tool compartments, make them time consuming to remove for transporting bulky cargo.

Based on the foregoing, it would be desirable to provide an effective device to enhance organization of smaller stored items in motor vehicles' interiors and particularly in pick-up truck beds, but one which can be stowed, i.e. would not take up space needed for larger items when the device is not in use.

SUMMARY OF THE INVENTION

The present invention is a stowable storage compartment for a motor vehicle of the type having at least one upstanding side panel. According to the invention the storage compartment has a frame which is mounted on at least one of said side panels with, for example hinges, and thereby is arranged to pivot about the hinge axis positioned on the side panel. The frame may be pivoted from a closed position where the frame is folded and generally parallel with the side panel, to an extended position where the frame extends outwardly to define an aperture for receiving articles therethrough. The storage compartment also houses a collapsible open container which is attached to the frame at the aperture and defines a boundary of the storage compartment. Additionally, the stowable storage compartment includes a lid which is mounted on the frame and is arranged to cover or uncover the aperture, and includes a recess or receptacle for holding the collapsible container when the storage compartment is stowed.

The present invention may also be mounted on one or more of the upstanding panels that define a bed, of a pick-up truck. In one such application of the invention, the stowable storage compartment can be pivotably mounted on an interior surface of one or more of the upstanding panels, thereby, when stowed, opening up valuable space for storage of bulky articles.

It should be understood that the detailed description and specific examples which follow, while indicating preferred embodiments of the invention, are intended for purposes of illustration only and are not intended to limit the scope of the invention.

DETAILED DESCRIPTION

In general the present invention is directed to a stowable storage compartment for organizing small articles to be carried within the interior of a motor vehicle. A particular application of the present invention is for a bed of a pick-up tuck.

Figure 1:
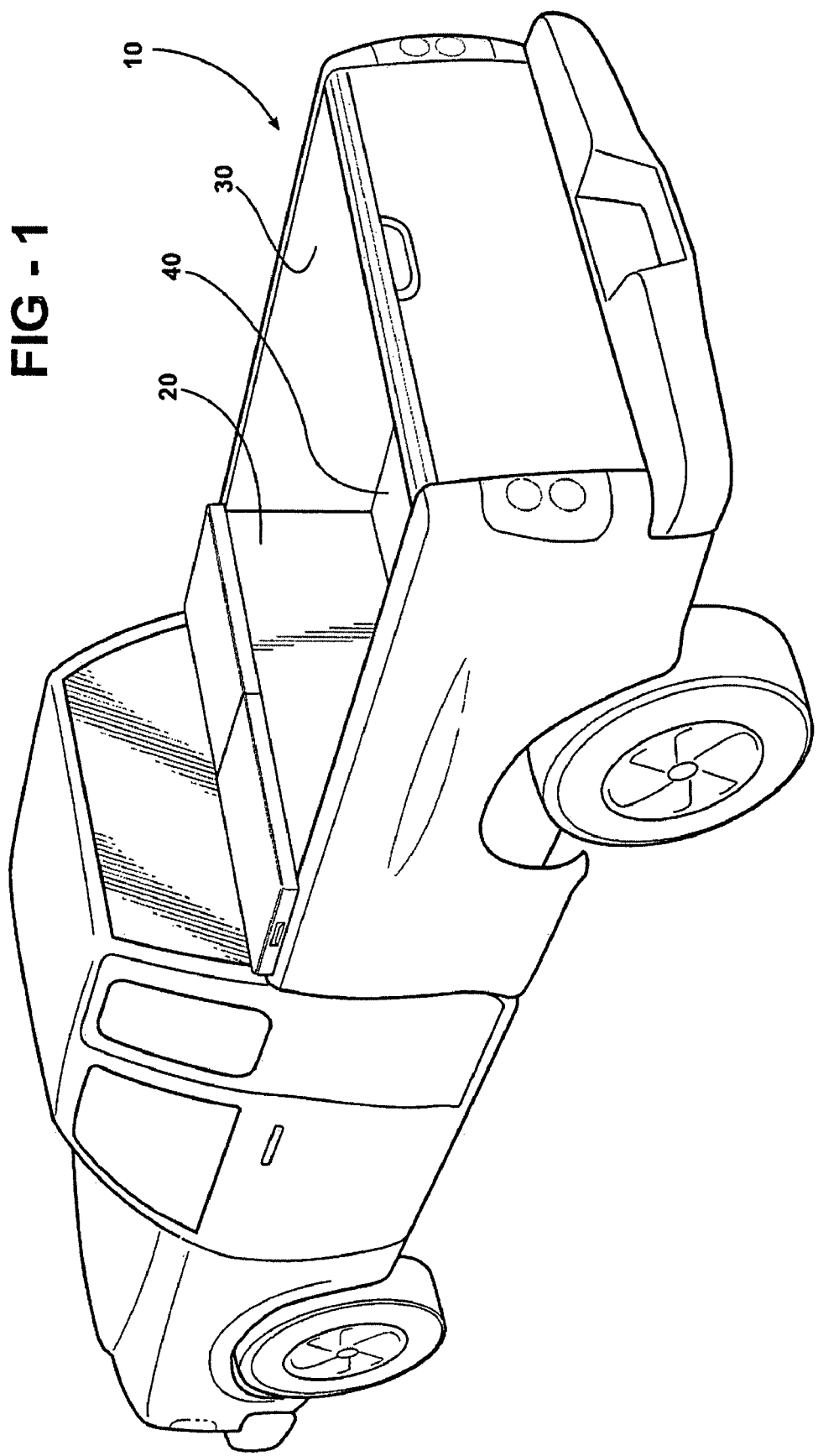
FIG. 1 is a perspective view of a typical fixed storage compartment for a pick-up truck bed.

Referring now to the drawings, like elements of the invention are identified with identical reference numerals throughout. FIG. 1 denotes a perspective view of a vehicle storage compartment according to the prior art, wherein pick-up truck bed 10 houses a fixed storage compartment 20. Fixed storage compartment 20 is permanently attached to at least one of truck bed side panels 30 and/or to bed floor 40 of the truck.

Figure 2:
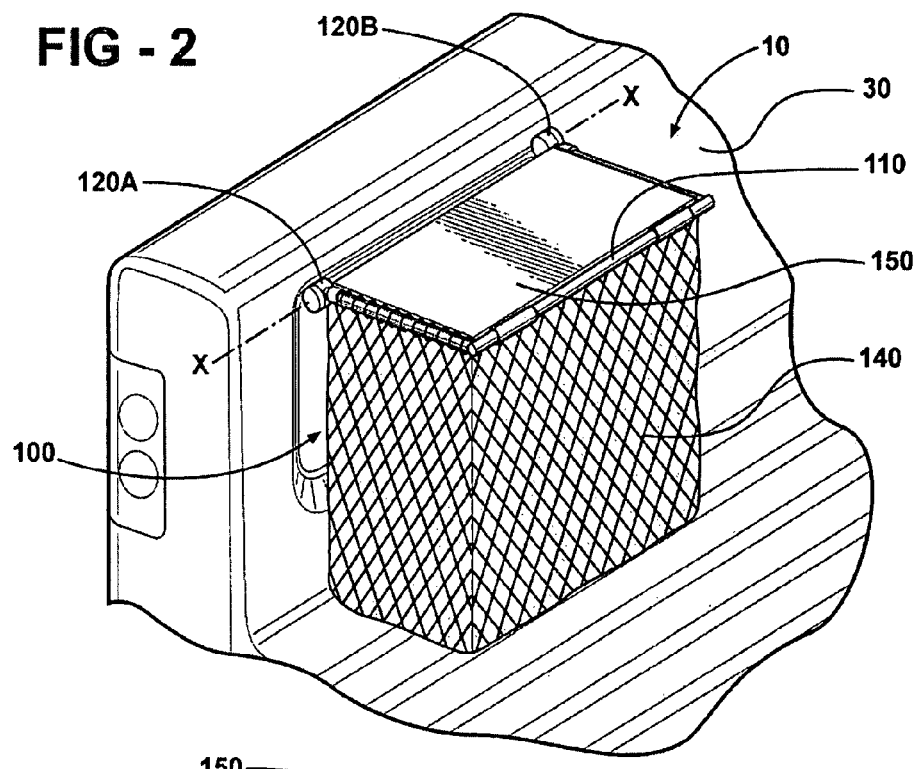
FIG. 2 is a perspective view of a pick-up truck bed with a stowable storage compartment deployed according to the invention.
Figure 3:
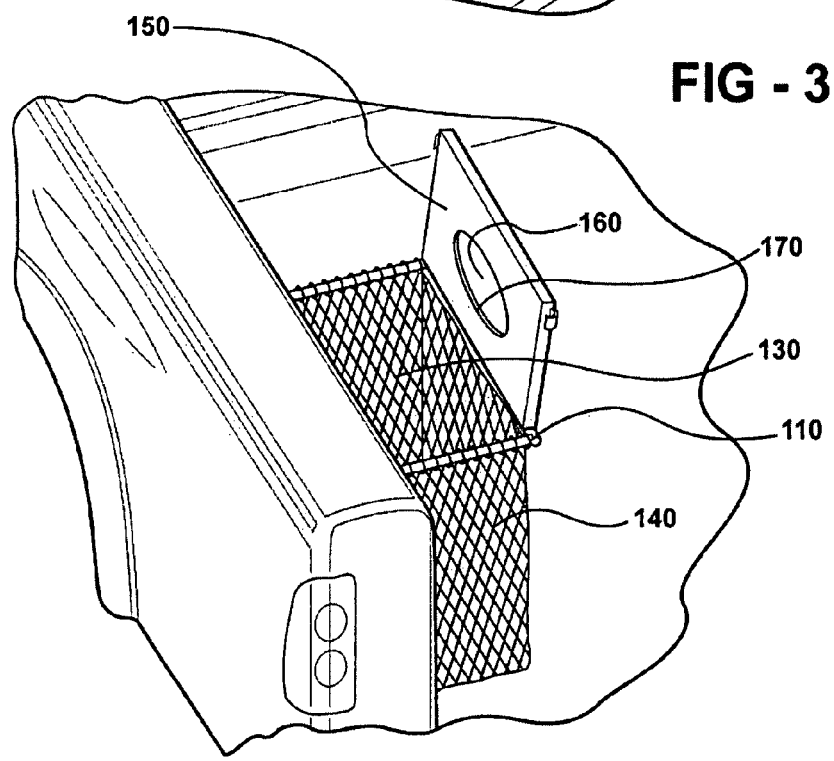
FIG. 3 is a perspective view of the lid positioned to uncover the stowable storage compartment according to the invention
Figure 4:
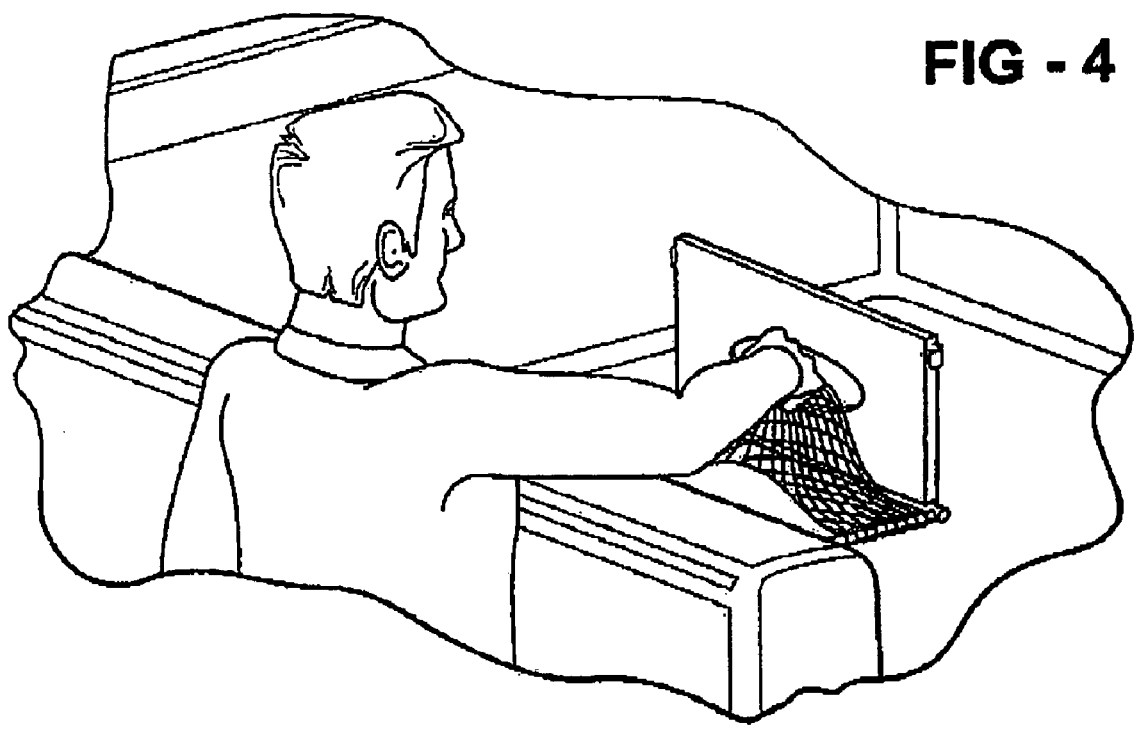
FIG. 4 is a perspective view of an operator removing a mesh bag from the receptacle in the lid of a storage compartment according to the invention
Figure 6:
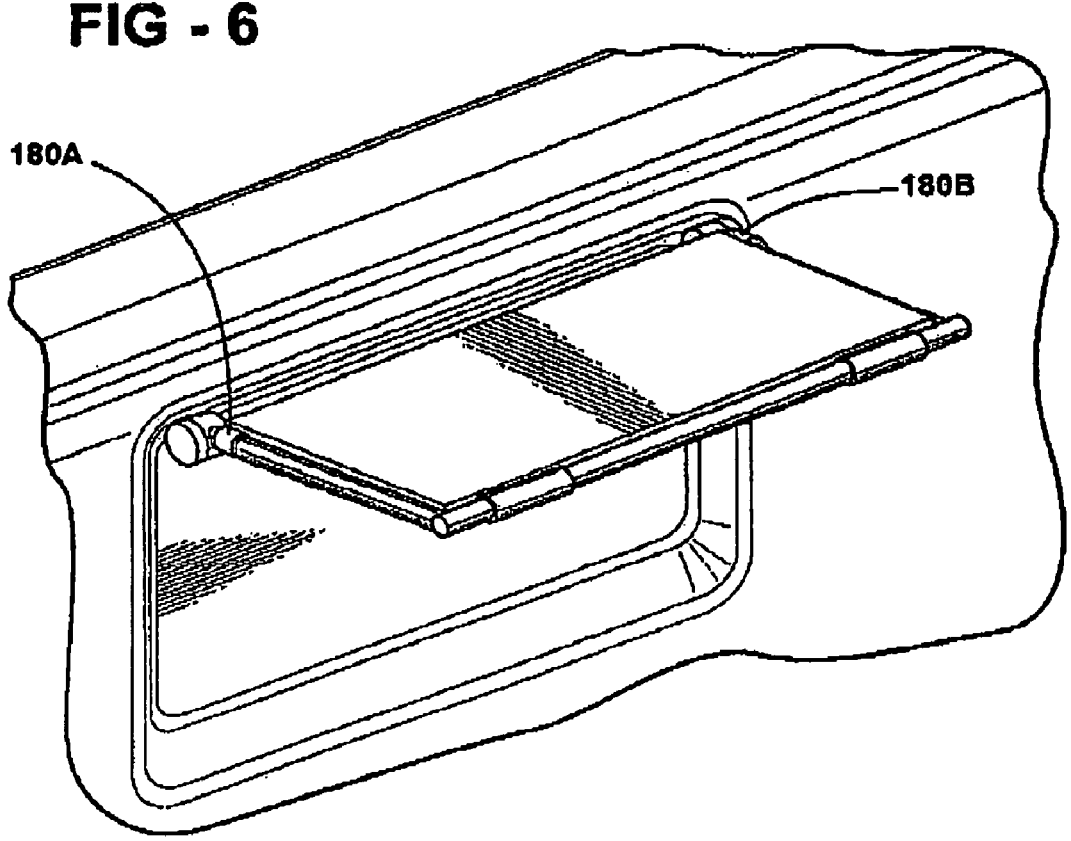
FIG. 6 is a perspective view of a frame and a lid of the stowable storage compartment positioned parallel to a pick-up truck bed floor according to the invention.
Figure 5:
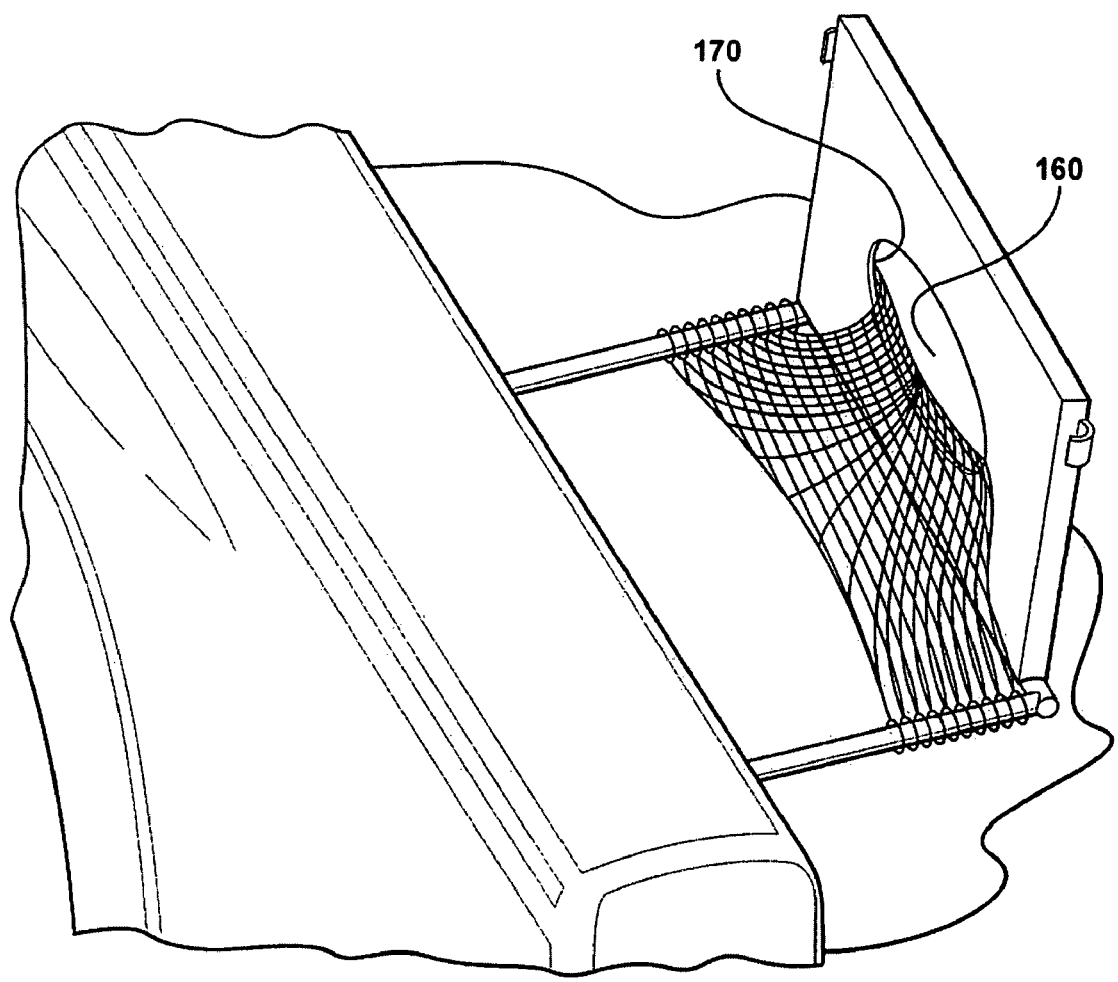
FIG. 5 is a perspective view of a mesh bag being held by a receptacle inside the lid of the stowable storage compartment according to the invention.
Figure 7:
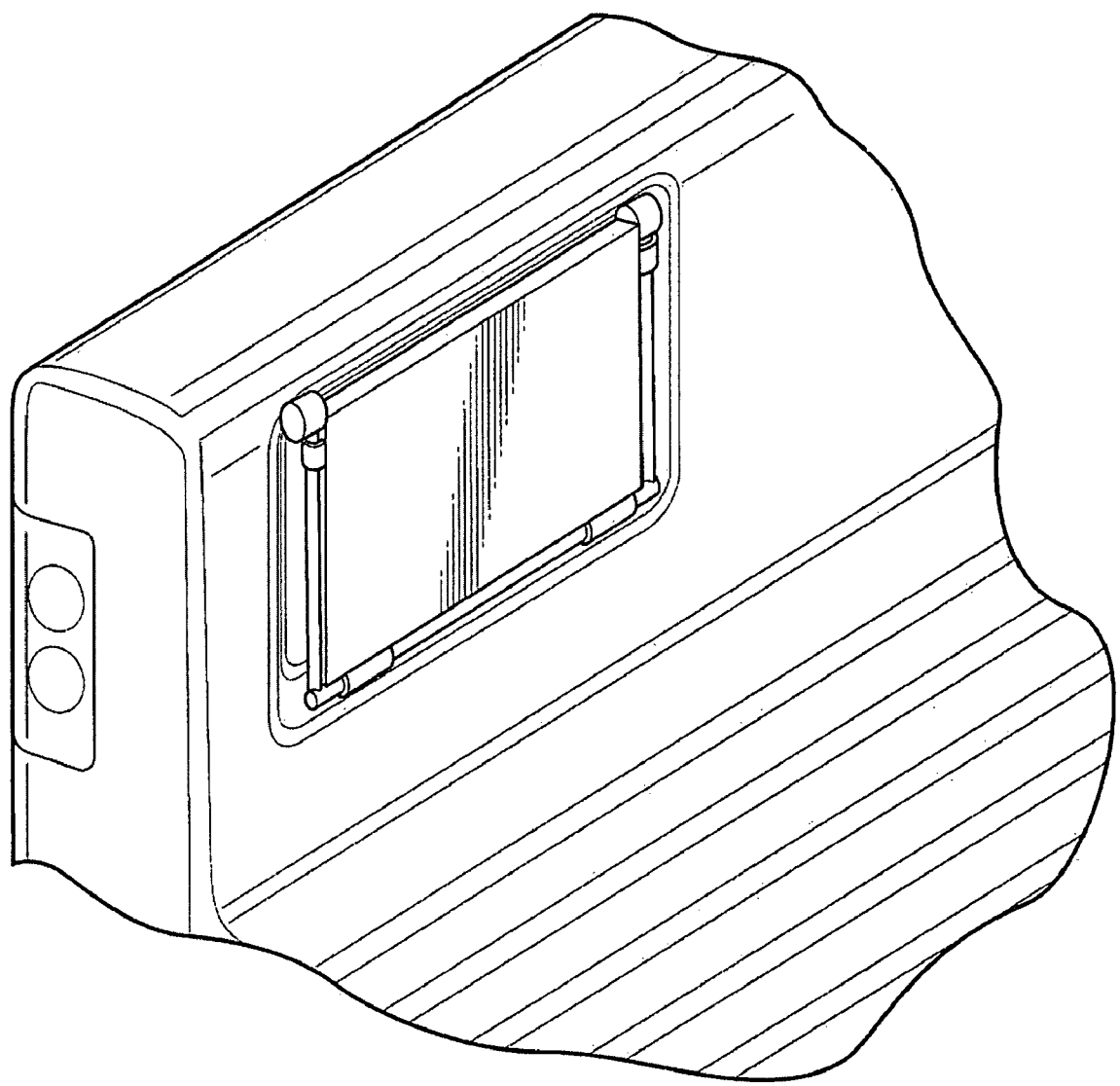
FIG. 7 is a perspective view of the stowable storage compartment stowed flush with the truck-bed side panel according to the invention.

Stowable storage compartment 100 according to the present invention is best seen in FIGS. 2-7. FIG. 2 denotes a perspective view of storage compartment 100 installed and deployed in truck bed 10. Storage compartment 100 includes frame 110. Frame 110 utilizes hinges 120A and 120B to pivot about axis X-X on side panel 30 from a closed position (FIG. 7), wherein the frame is folded and generally parallel with the side panel, to an extended position (FIG. 2), wherein the frame extends outwardly from the side panel to define aperture 130 for receiving articles. All components of frame 110 are constructed from a rigid and corrosion resistant material, such as specially treated aluminum, stainless steel or engineering plastic, and are sized for particular load requirements. Hinges 120A and 120B include a locking mechanism, such as a pin (not shown), which operates to secure frame 110 in the extended position. Flexible container portion 140, which is made from any foldable material such as a natural or synthetic fabric or a woven or interlocking mesh, is mounted on frame ITO, and defines the boundary of the storage compartment. Lid 150, is hinged to frame 110 and is arranged to cover and uncover aperture 130. Lid 150 includes receptacle 160 for holding the flexible container portion 140, and opening 170 for accepting the collapsible storage container, when storage compartment 100 is folded and not in use (FIG. 5). Lid 150 additionally includes latching tabs 150A and 150B for securing the lid to frame 110 when the lid is placed in a position to cover aperture 130 (FIG. 6). For ease of incorporating the receptacle and the tabs, lid 150 is preferably made from a moldable engineering plastic, but may also be made from any other suitable corrosion, i.e. weather, resistant material, such as aluminum. When not in use, storage compartment 100 can be stowed out of the way in a closed position, flush with side panel 30 of truck bed 10 (FIG. 7).

Stowable storage compartment 100 may also be utilized in a passenger section of a motor vehicle interior, where additional storage features are often useful, but where a fixed storage compartment may interfere with accommodation of passengers or larger cargo. Any interior side panel can be adapted to accommodate the storage compartment of the invention as described above in relation to the bed of a pick-up truck.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stowable storage compartment in combination with a sidewall of a vehicle comprising:
   (a) a vertically extending sidewall panel of a vehicle having a recess formed therein;
   (b) a stowable storage compartment comprising:
      (1) a frame carried by the vehicle sidewall panel and comprising a hinge arrangement enabling pivotable movement of the frame about a generally horizontal axis between an outwardly extending storage compartment position and a downwardly extending stowed position, the frame defining a storage compartment opening through which an article can pass;
      (2) a flexible container portion carried by the frame that extends downwardly from the frame when un-stowed such that it is capable of holding an article therein;
      (3) a lid pivotally attached to the frame that is pivotable between a closed position where the lid overlies the storage compartment opening and a position disposed from the closed position permitting an article to pass through the storage compartment opening with the lid comprising a receptacle formed in the lid in which the flexible container portion is stowable and an opening in communication with the receptacle through which the flexible container portion extends when stowed in the receptacle; and
   wherein the flexible container portion is stowable in the receptacle in the lid and the lid pivotable to the downwardly extended stowed position where the lid is received in the recess and substantially flush with the surrounding vehicle sidewall panel.

2. The storage compartment and vehicle sidewall combination of claim 1 wherein the flexible container portion is comprised of mesh.

3. The storage compartment and vehicle sidewall combination of claim 1 wherein the hinge arrangement comprises a plurality of spaced apart hinges that attach the frame to the vehicle sidewall panel.

4. The storage compartment and vehicle sidewall combination of claim 1 wherein the hinge arrangement comprises a plurality of spaced apart hinges.

5. The storage compartment and vehicle sidewall combination of claim 1 further comprising latching tabs that secure the lid to the frame when the lid is disposed in the closed position.

6. The storage compartment and vehicle sidewall combination of claim 1 wherein the frame comprises a pair of arms that extend outwardly from the hinge arrangement and a cross bar extending between the arms to which the lid is pivotally attached wherein the lid pivots away from the sidewall panel when pivoted toward the position disposed from the closed position.

7. The storage compartment and vehicle sidewall combination of claim 1 wherein the frame comprises a pair of arms that extend outwardly from the hinge arrangement and a cross bar extending between the arms to which the lid is pivotally attached and wherein the lid comprises a pair of latching tabs with each one of the latching tabs engaging a corresponding one of the frame arias retaining the lid in the closed position when pivoted to the closed position.

8. A stowable storage compartment in combination with a motor vehicle having at least one upstanding panel, comprising:
   a motor vehicle comprised of an upstanding panel;
   a stowable storage compartment comprised of a frame carried by the panel and movable between a stowed position where the frame generally overlies a portion of the panel and another position disposed from the stowed position where the frame extends outwardly from the panel, a flexible container portion carried by the frame that hangs downwardly from the frame when the frame is disposed in an outwardly extended position, and a lid in operable cooperation with the frame that is movable relative to the frame between a closed position preventing an article from being placed in the flexible container and a position disposed from the closed position and away from the upstanding panel when the frame is disposed in an outwardly extended position permitting an article to be placed in the flexible container portion; and
   wherein the lid comprises a receptacle in which the flexible container portion is receivable enabling storage of the flexible container portion in the lid when the lid is disposed in the closed position and the frame is disposed in the stowed position.

9. The storage compartment and vehicle panel combination of claim 8 wherein the flexible container portion is comprised of mesh.

10. The storage compartment and vehicle panel combination of claim 8 wherein the frame is attached to the panel by a hinge arrangement.

11. The storage compartment and vehicle panel combination of claim 10 wherein the hinge arrangement comprises a plurality of spaced apart hinges.

12. The storage compartment and vehicle panel combination of claim 8 wherein the lid is attached to the frame by a hinge arrangement.

13. The storage compartment and vehicle panel combination of claim 12 further comprising latching tabs that secure the lid to the frame when the lid is disposed in the closed position.

14. The storage compartment and vehicle panel combination of claim 8 wherein the upstanding panel has a recess formed therein and wherein the lid and frame are receivable in the recess when the lid is disposed in the closed position and the frame is disposed in the stowed position.

15. The storage compartment and vehicle panel combination of claim 14 wherein the lid and frame lie substantially flush with the surrounding upstanding panel when received in the recess formed in the upstanding panel.

16. The storage compartment and vehicle panel combination of claim 8 wherein the frame comprises a pair of arms that extend outwardly when the frame is located in a position disposed from the stowed position and an interconnecting cross bar extending between the arms to which the lid is pivotally attached and wherein the lid pivots away from the upstanding panel when moved toward a position disposed from the closed position.

17. A stowable storage compartment in combination with a motor vehicle having at least one upstanding panel, comprising:
- a motor vehicle comprised of a panel;
- a stowable storage compartment comprised of a frame pivotally carried by the panel and pivotable between a stowed position where the frame generally overlies a portion of the panel and another position disposed from the stowed position where the frame extends outwardly from the panel, a flexible container portion cried by the frame that hangs downwardly from the frame when the frame is disposed in an outwardly extended position, and
- a lid pivotally attached to the frame and pivotable between a closed position preventing an article from being placed in the flexible container and a position disposed from the closed position and away from the upstanding pane when the frame is disposed in an outwardly extended position permitting an article to be placed in the flexible container portion; and
- wherein the lid is configured with a receptacle formed therein in which the flexible container portion is receivable enabling storage of the flexible container portion in the lid when the lid is disposed in the closed position and the frame is disposed in the stowed position.

18. The storage compartment and vehicle panel combination of claim 17 wherein the upstanding panel has a recess formed therein and wherein the lid and frame are receivable in the recess when the lid is disposed in the closed position and the frame is disposed in the stowed position.

19. The storage compartment and vehicle panel combination of claim 17 wherein the frame is attached to the upstanding panel by a plurality of pivots.

20. The storage compartment and vehicle panel combination of claim 17 wherein the lid is attached to the frame by a plurality of pivots.

* * * * *